May 13, 1969 G. BÜTTNER ET AL 3,444,328

COUPLER CIRCUIT HAVING VOLTAGE RESPONSE SWITCHING MEANS AT CROSS-POINTS THEREOF FOR TELEPHONE EXCHANGE COUPLING FIELD

Filed Sept. 3, 1965 Sheet 1 of 3

3,444,328

COUPLER CIRCUIT HAVING VOLTAGE RESPONSE SWITCHING MEANS AT CROSS-POINTS THEREOF FOR TELEPHONE EXCHANGE COUPLING FIELD

Gerhard Büttner and Klaus Bushmann, Munich, and Wolfgang Papke, Socking uber Starberg, and Herbert Philipp, Munich, Germany, assignors to Siemens Aktiengesellschaft, Munich, Germany Filed Sept. 3, 1965, Ser. No. 484,981
Claims priority, application Germany, Sept. 30, 1964, S 93,497
Int. Cl. H04m 3/56
U.S. Cl. 179—18 3 Claims

ABSTRACT OF THE DISCLOSURE

A control matrix in coordinate form having polarized relays for controlled coupling wherein at the crossing points thereof the operating coil of an associated relay is connected in series with a voltage dependent, current-direction independent resistor between the corresponding row and column lines and wherein energization of the relays to different operating positions may be effected over the same circuits of the control matrix.

*Summary of the invention*

This invention relates to a circuit arrangement for long-distance telephone communication in which circuit arrangements of the coupling field or matrix type are formed with rows and columns of lines, and crossing points between the rows and columns are completed by individual switching devices having windings connected therebetween, such switching devices being connectable to an operating current source over both the row and column lines. The invention is particularly characterized by avoidance of the disadvantage of known circuit arrangements of this type through use of voltage-dependent, current-direction-independent resistors connected in series with the switching devices of the circuit fields; that is, through use of resistors which have a relatively high resistance value below a certain limiting or critical voltage and above that voltage have a relatively low resistance. Further, in accordance with the invention, the elements of the circuit are so selected that the sum of the said limiting voltage or critical voltage, and the operating voltage required for actuation of the associated switching device, is smaller than the voltage which is available at the row and column lines, while three times the limiting or critical voltage is larger than the voltage which is available at the row and column lines.

The solution of the problem in accordance with the invention differs from known arrangements in which decoupling is obtained by means of rectifiers, among other things, by the fact that the current-direction-dependent effect of electrical valves is used in known circuits, while in the solution of the invention the ratio of a voltage limiting value of a current-direction-independent resistor to the effective operating voltage at the mentioned crossing point is made effective in a two-fold relationship.

In accordance with the invention either varistors or glow lamps, etc. may be employed as the voltage-dependent current-direction-independent resistors.

It is a particular advantage of the invention that a direct current voltage, as well as an alternating current voltage, can be employed to feed current to circuit fields constructed in accordance with the invention. A further advantage is that bi-stable or polarized relays can be employed at the crossing points of the circuit field and energized to two different operating positions over the same circuits, and even held in an intermediate position.

In the operative embodiment to be described hereinafter the invention is shown as employed in a relay coupler in which coupling relays are arranged as switching devices at the row and column lines, these switching devices being connected individually in series with varistors, which are voltage-dependent, current-direction-independent resistors. The coupling relays are operated with direct current of two different polarities so that they are switchable alternatively into two different stable conditions. Instead of varistors, of course glow lamps can be utilized. Further, for actuation of the coupling relays, alternating current can be employed, in which case the coupling relays would be of the alternating current-sensitive type.

*State of the prior art*

In circuit arrangements of the type to which this invention relates, there is provided for each row of a coupler a single row line, and for each column a single column line, and one relay is provided at each crossing point of the row and column lines. The winding of each relay is connected between the row line and the column line, with a rectifier in series therewith. To energize a certain relay, the row line and the column line assigned to the relay are connected to an operating current source over row contacts and column contacts. The circuit is completed in such fashion that the relay at the crossing point in question is in current-passing direction, and the rectifiers prevent other circuits from becoming effective at the same time to operate other relays than that positioned at the particular crossing point in question. Consequently, during the actuation of a particular relay, all relays not positioned at the same column line and row line are connected to the operating current source with one winding connection at the actuated row line and with the other winding connection at the actuated column line. In this connection, which comprises all relays but one of such a circuit field, and which represents a branched row and parallel circuit, the relays directly connected to the actuated row line and those directly connected to the actuated column line, whose rectifiers are employed in current-passing direction, are prevented from responding to the current source by reason of the fact that the rectifiers assigned to all relays connected directly with the row lines and column lines which are not actuated, are employed in their blocking direction. The decoupling of the responding circuits corresponding to each of the relays is thus dependent upon the current-direction-dependent blocking effect of electric valves. With a circuit of the type indicated, if alternating current is to be employed as the power source for the relay, then only one of the two half waves of the source can be used for energization of the relays of the circuit field.

If biased relays, having two stable positions so that they can be switched from one to the other position through energization in opposite polarity, are employed, still more disadvantages arise. This is by reason of the fact that two different energizing circuits are necessary to switch over from a first position into a second position, and then from the second position into the first position. For this purpose in each case for each crossing point between a row and a column two rectifiers are needed, and either for the rows or for the columns, for each row or column, respectively, two row lines or two column lines, respectively, are needed. Thus, the switching requirements are greater, particularly with respect to the wiring and connecting functions. Another disadvantage of the prior art system employing rectifiers exists in the case of use of an auxiliary relay employed in place of either of the rectifiers per row, or the rectifiers per column, such auxiliary relay having operating contacts connected in series at each coupling point with the relay in question of the same row or column. Only one line each is provided for row and column; however, one relay is required for each row or column per crossing point of the corresponding row line or column line, respectively, with each column line or row line possessing one contact, respectively. In the case of large couplers, so many contacts are required for each row or column, respectively, that more relays have to be provided.

Glow lamps are already being employed in coupling fields, but in another connection and with another coupling effect. That connection and effect is for path-finding operations. In a multi-stage coupling field based, for example, on a grouping such as shown in FIG. 1 of the accompanying drawings, the couplers are arranged in several successive coupling stages. Connections from an input of a first coupling stage to an output of a coupler of the last coupling stage can be established over different outputs of the first coupler and different inputs of the last coupler, and therefore over different couplers of the intermediate coupling stages. As a result, different connection possibilities exist for a connection to be made between determined end points in the coupling field. These different connection possibilities correspond to paths through the coupling field which successively extend through coupling points of couplers of all coupling stages. Only one of the connections in the coupling field corresponding to these different connection possibilities may be completed. For this purpose, response circuits are formed parallel to the connection paths which can be connected through. At each coupling point between the connection conductors, there are positioned contacts of the coupling relay which is assigned to the particular coupling point. Between the response conductors which cross at a coupling point, there is positioned the response coil of the coupling relay. This coil is connected in series with a parallel connection consisting of an operating contact of the relay and a glow lamp.

If a direct current voltage is connected to the response conductors of an input and an output, over a series resistor, then several response circuits extending over several series connected glow lamps and coupling relay windings are closed, in correspondence to the different connection possibilities, these circuits being all equal to each other. Before the glow lamps have ignited, these circuits all possess high ohmic value. Upon ignition of the glow lamps positioned in series in a connection path, the response circuit corresponding to this connection path is switched into a low ohmic value so that in the other responsive circuits no glow lamp can ignite. The series resistor is selected such that, for the purpose of igniting the glow lamps, it only extends in a single one of the response circuits corresponding to the various connection possibilities. Upon response of the coupling relays, the glow lamps are short circuited over the contacts of the relay.

In this prior art circuit, the glow lamps serve only for the selection of one among several different possibilities. In contrast, the present invention does not use this technique, but rather the path-finding task may be performed in an altogether different manner, which is unimportant to the invention. Rather, the invention resides in the selection of voltage-dependent, current-direction-independent resistors which have a critical voltage value greater than ⅓ of the operating voltage effective at the row lines and the column lines, and smaller than the said operating voltage, less the minimum response voltage of the switching devices, such as the coupling relays.

*Description of the invention*

The invention will now be more fully described in conjunction with an operative embodiment thereof shown in the accompanying drawings.

Figure 1:
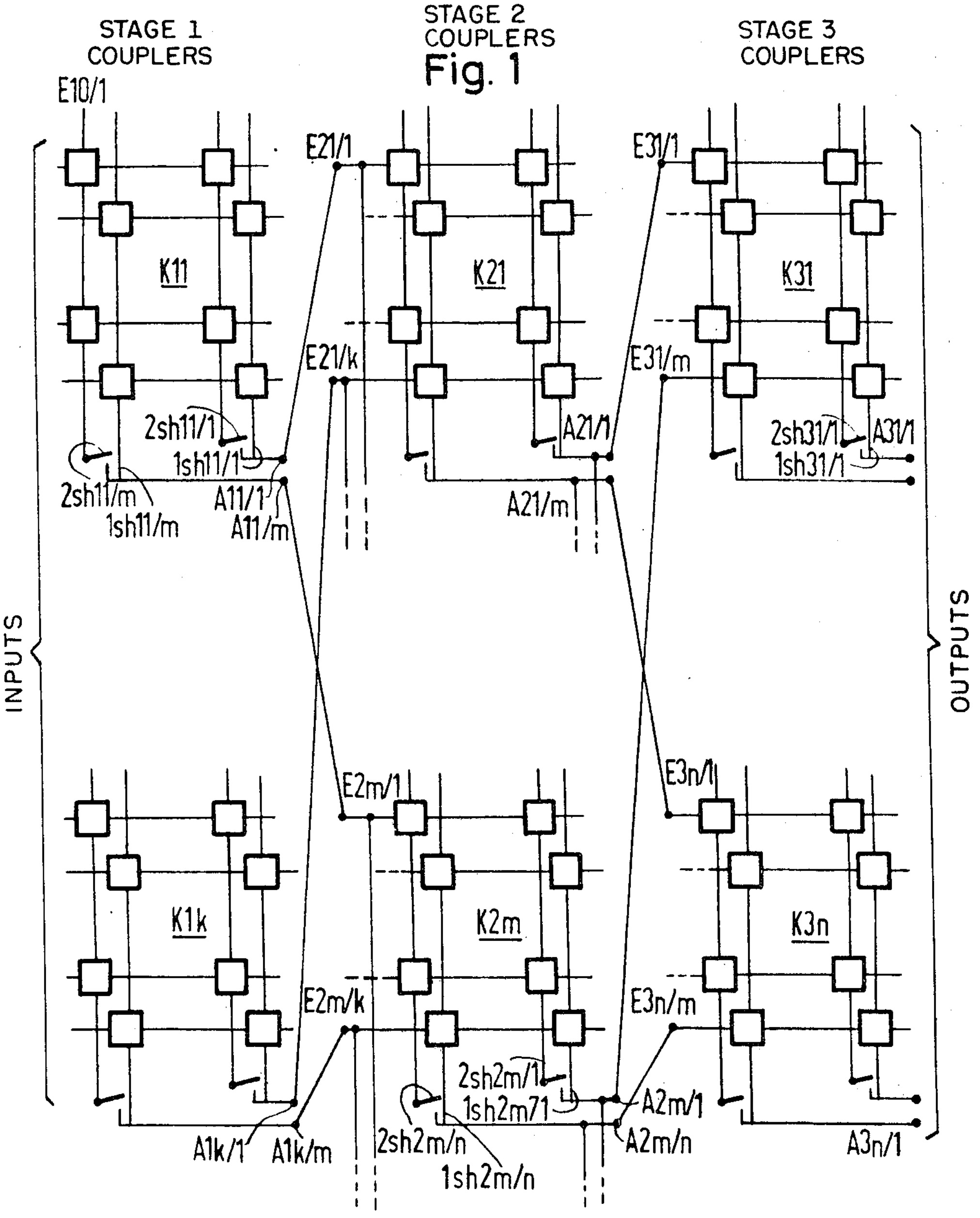
FIG. 1 is a block diagram showing of a three-stage coupling field formed in accordance with the invention.

In the three-stage coupling apparatus of FIG. 1, the first stage includes couplers K11 to K1*k*, the second stage includes couplers K21 to K2*m*, and the third stage includes couplers K31 to K3*n*. As indicated, the specifically shown couplers are respectively the first and the last in a stage which may include a plurality of other couplers. Each coupler has inputs, such as E21/1, for coupler K21, and outputs such as A21/1 of the same coupler. The couplers are connected together over intermediate lines in such a way that each coupler of the second stage has an input connected to each one of the couplers of the first stage, while each coupler of the third stage has an input connected to each coupler of the second stage. Of course the inputs and outputs of the couplers of the first and last coupling stages, respectively, are the inputs and outputs of the coupling field.

If a connection is to be established between one inlet, such as E11/1 to an output, such as A31/1, over the coupling field, only the couplers K11 and K31 in the first and third stages, respectively, can be employed, but in the second stage any one of the couplers K21 to K2*m* can be used. The one of the couplers in the second stage to which the connection is completed, depends upon whether or not the coupling of both intermediate lines to the specified couplers in the first and third stages is completed, for that coupler of the second stage. A suitable connection path is ascertained, selected, and marked through a path-finding operation for which many procedures are employed, this operation taking into consideration the condition of all intermediate lines of the coupling field. U.S. Patent No. 3,038,968 shows a path-finding arrangement employing a path-finding network of analogous construction to that of the coupling field, and which has a path-finding conductor for each row line and an intermediate line relay with a holding contact connected to the assigned path-finding conductor. Paths in the coupling field are ascertained to be free and suitable for through switching connection, when the assigned path-finding conductors are capable of carrying current over the entire coupling field. Through a selection operation one of several connection possibilities is then selected and marked for the through switching of the connection.

In the instant operative embodiment, connections to be switched through are marked individually at each coupler. Thus each connection is marked at three couplers, as will be explained in more detail herebelow.

Figure 2:
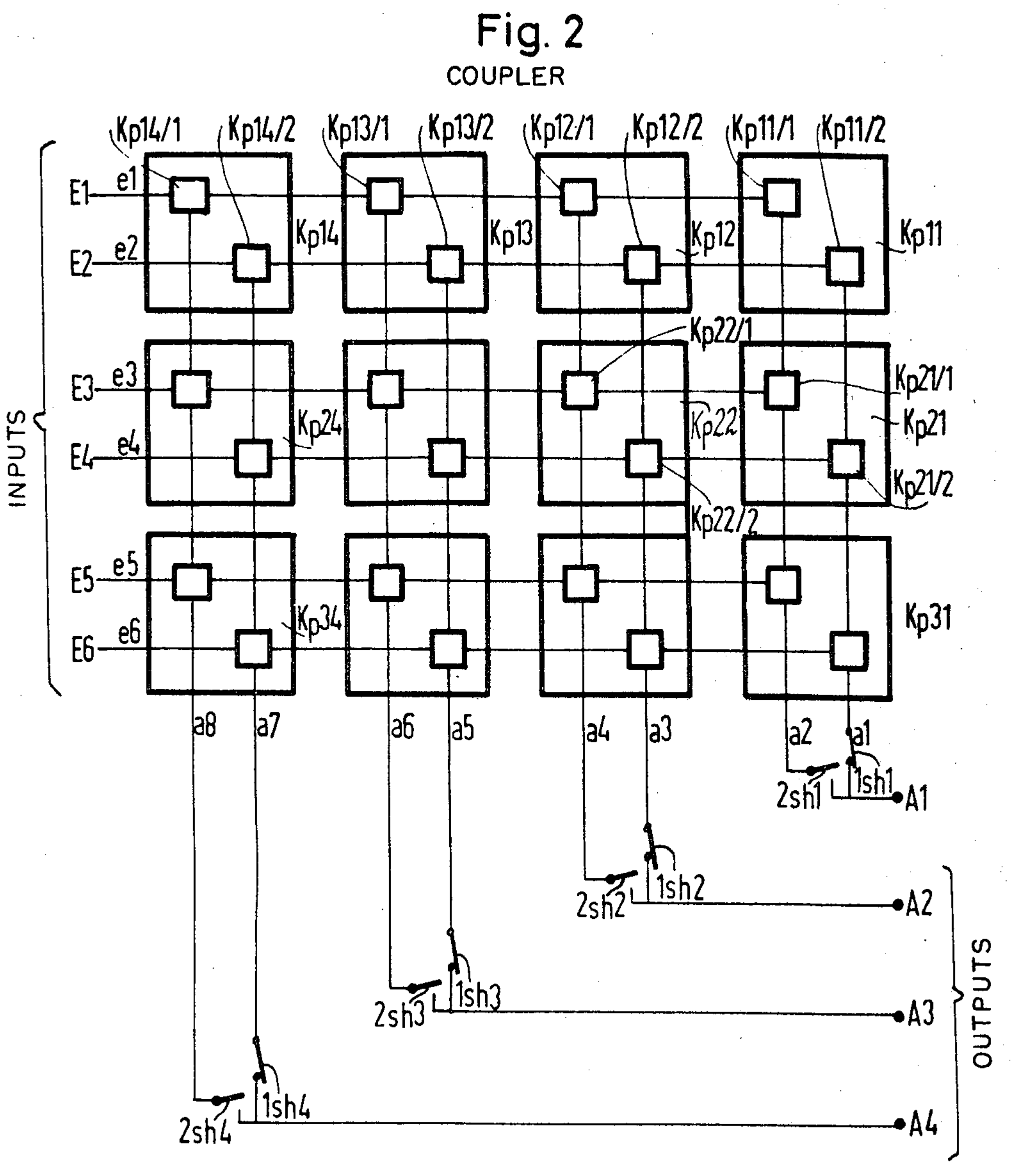
FIG. 2 is a more detailed diagrammatic showing of one of the couplers of the apparatus of FIG. 1; and, FIG. 3 is a schematic showing of a control system for the coupler of FIG. 2.
Figure 3:
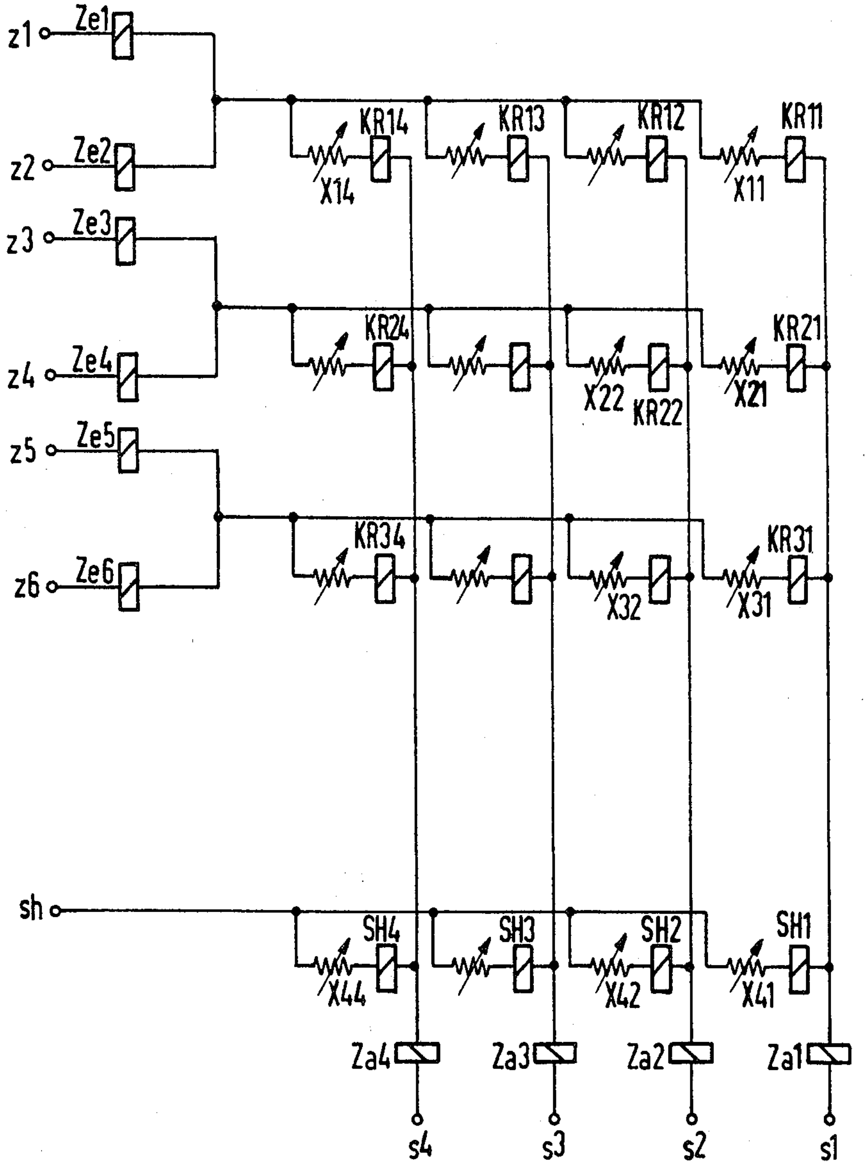

As has been indicated, FIGS. 2 and 3 show one of the couplers of FIG. 1 in more detail. For ease in illustration, six inlets have been indicated and four outlets, for the coupler, though of course these numbers are merely employed for convenience of illustration and explanation. It will be seen from FIG. 2 that the lines *e*1 to *e*6 and *a*1 to *a*8 are arranged with respect to each other in matrix or coordinate fashion. The row lines *e*1 to *e*6 are individually assigned to inputs E1 to E6 and are joined together in pairs, as indicated, with lines *e*1 and *e*2, *e*3 and *e*4, *e*5 and *e*6 associated together. The column lines *a*1 to *a*8 correspond to outputs A1 to A4 and are also joined together in pairs, with the lines *a*1 and *a*2 associated together, the lines *a*3 and *a*4 associated together, etc. It will be seen therefore that each output is provided with a pair of column lines.

It will further be seen that one of each pair of column lines is connected to the associated output only by an auxiliary column relay, such as relay SH1, having associated normally open contacts 2*sh*1 connected between the column line *a*2 and the output A1. The other of the pair of conductors, *a*1 is normally connected to the output A1 through normally closed contacts 1sh1 of the same relay. The row lines, such as e1, and the column lines, such as a1, form cross points which in a coupling field are also called coupling points, such as Kp11/1. The pairs of row lines such as e1 and e2, and the pairs of column lines such as a1 and a2, thus each form four crossing points. However, coupling switching devices are provided only at two of these crossing points, that is at the crossing points between two first lines, such as e1 and a2 ,and two second lines, such as e2 and a1, of one pair of row lines and one pair of column lines. Thus, the two pairs of lines form only two coupling points which are here designated as one coupling point pair, for example Kp11, that coupling point pair being shown by the large block at the upper right of FIG. 2. One relay, such as KR11, is assigned to each coupling point pair such as Kp11. (See FIG. 3 for relay KR11 and similar relays.)

In conventional fashion the operating contacts of the coupling relays which prevent connection together of the individual signal conductors of the row and column lines are located at the coupling points. If a connection is to be switched through over the coupling field, then the corresponding marking operations are carried out individually at the couplers selected through the path-finding operation. For the purpose of illustration it shall be assumed that in the coupler shown in FIG. 2 a connection is to be switched through from the input E4 to the output A2. For this purpose, the row marking point z4 shown in FIG. 3 and the column marking point s2 must be connected to an operating current source. Such a source (not shown) may be connected across the following branch:

(1) z4, Ze4, X22, KR22, Za2, s2

In this circuit the relay KR22 is energized to cause it to close its contacts at coupling points Kp22/1 and Kp22/2. As a result, the row lines e3 and e4 and the column lines a3 and a4, respectively, are connected together to cause input E4 to be connected to output A2. The column line a4 is not effective in this connection, since the contacts 2sh2 are open.

The circuit (1) contains a voltage-dependent resistor X22. In fact each of the coupling relays KR11 and KR34 has such a resistor connected in series therewith, as does each of the auxiliary column relays SH1 to SH4. A varistor such as shown at X22 in FIG. 3 and contained in circuit (1) may be employed, or any other voltage-dependent resistor, such as a glow lamp or the like, can be used. These voltage-dependent resistors are current-direction-independent. They exhibit a limiting voltage value in both current directions. If the voltage applied thereto exceeds this limiting voltage value in a circuit in which such voltage dependent resistors are contained, then the intrinsic resistance thereof decreases from a relatively high value to a relatively low value. This limiting or critical voltage value is such for all of the voltage-dependent resistors that it is smaller than the difference between the voltage which is effective at the conductors of the row lines and the column lines of FIG. 3 and the minimum actuating voltage of the coupling relays, such as KR22, and further so that it is larger than ⅓ of the voltage applied to the response conductors of the row and column lines. Now if a column and a row line are marked by forming a circuit such as circuit (1), and applying a suitable voltage thereto, then this marking can be effective because the voltage-dependent resistor such as X22, connected in series with the coupling relay, is of low ohmic value by reason of the characteristic mentioned above. However, no further circuits can become effective in this marking operation, since in any further possible circuits three voltage-dependent resistors would be connected in series, for each such circuit; for example, in the marking of the column marking point s2 and the row marking point z3, among others the voltage-dependent resistors X32, X31, and X21, would be present.

Moreover, in circuit (1), the intermediate line relays Ze4 and Za2 are energized. The intermediate line relays Ze1 to Ze6 and Za1 to Za4 are individually assigned to the six input intermediate lines and to the four output intermediate lines of each coupler, respectively. In each case they identify whether the intermediate line is free or busy. If intermediate line relays are assigned to the inputs and outputs of a coupler in such fashion, then in a three-stage coupling field, only the couplers of the second coupling stage need be equipped with intermediate line relays. Contacts of these intermediate line relays are located in a path-finding network such as shown and described in the aforesaid U.S. Patent No. 3,038,968.

If a connection is to be connected through from inlet E3, rather than inlet E4, to A2, the marking point sh must be marked, in addition to the marking points z3 and s2. Consequently, in the circuit including the voltage source, the following connections must be made:

$$(2)\qquad \frac{z3,\ Ze3,\ X22,\ KR22}{sh,\ X42,\ SH2},\ Za2,\ s2$$

It will be seen that this circuit includes the relay KR22, but it also includes the auxiliary column relay SH2, both of which respond, so that the contacts 2sh2 are closed and contacts 1sh2 are opened. The result is that column line a4 is connected with output A2, so that the input E3 is duly connected with the output A2. By reason of the opening of contacts 1sh2, the column line a3, which of course is connected to the same coupling point pair Kp22, is ineffective.

The coupling relays, auxiliary column relays, and the intermediate line relays are all formed as bi-stable relays. Their bi-stability can be merely mechanical in nature, or can also be achieved through utilization of permanent magnets. A single momentary current pulse is sufficient for actuation of such relays. They remain in actuated condition without requiring any holding energization. For this reason it is not necessary to form a holding circuit for such relays. If energized relays of this kind are to be returned to rest position (as they are shown in the drawings), then the circuits (1) or (2) are completed again, but the current direction therethrough is caused to be opposite to the original direction. This of course can be achieved by merely reversing the connection of the voltage source to the circuit.

The resistors X11 to X44 in the control conductor network of the coupler permit two current directions in the control conductor system, by reason of their independence of current direction. Consequently, it is possible to energize and de-energize, or to reverse bi-stable relays with the same circuits, and yet to guarantee a safe separation of starting and stopping processes, by reason of a voltage dependence of these elements.

The selection of bi-stable relays as coupling switching devices in such a multi-step coupling field allows use of the principle of path-doubling, in simple manner, in a multi-stage coupling field. The reason is that the holding circuits which would nullify the advantages achievable through path-doubling by reason of the special expenditures necessary in multi-stage coupling fields for separation of such holding circuits, are not necessary. The expenditure of an auxiliary column relay for each column is relatively smaller, the more rows are provided for each coupler. The path-doubling system makes it possible to provide only one coupling relay, such as KR11, for two coupling points, such as Kp11 and Kp12. If it is considered that a relay with four or six operating contacts is slightly more expensive than a relay with two or three operating contacts so that the coupling field can be formed with two or three conductors in contrast with the one conductor illustration if FIG. 2, the advantage achieved is readily understood, since it is possible to decrease very substantially the expense of the coupling fields, because the number of the required coupling relays in a coupler equals half of the product of the number of the inputs and outputs of a coupler.

So far we have not considered the situation in which two connections are to be switched through simultaneously, independently of one another, over a pair of row lines, through a coupler. It will be assumed that a first connection is to be switched through from input E4 to output A2 and a second connection from input E3 to output A1. For the first of the connections, coupling relay KR22 is energized and for the second connection, coupling relay KR21 and an auxiliary column relay SH1 are energized. The response circuits are of course analogous to those described hereinabove. The first connection goes from inlet E4 over row line *e*4, over coupling point K*p*22/2, column line *a*3, auxiliary column relay holding contact 1*sh*2, to output A2. The second connection goes from input E3 over row line *e*3, over coupling point K*p*21/1, column line *a*2, and the closed contacts 2*sh*1 of the auxiliary column relay SH1 to output A1. The release of these connections can be carried out separately and independently from one another over the same circuits which are used to establish the connections. In this case, for the establishing and the releasing operations, two different current directions are employed.

The fact that column line *a*1 is connected to the first of the mentioned connections over coupling point K*p*21/2 is of no significance, as this connection must remain without effect due to the opening of contacts 1*sh*1. The same of course is true with respect to column line *a*4, by reason of the opening of contacts 2*sh*2.

If tri-stable relays with reversing contacts are employed as auxiliary column relays and possess a contact-free holding position and two different contact actuating operating positions, then the contacts of these relays can be utilized for the path-finding procedure, as well. Well-known methods can be utilized for the path-finding operation, in which the operating contacts of intermediate line relays can be employed.

It will readily be apparent that this invention is not limited to the particular embodiments shown in the drawings, and indeed the embodiments have only been schematically illustrated. Accordingly, the invention is to be considered limited only by the scope of the appended claims.

We claim:

1. A coupler circuit for a telephone exchange coupling field comprising an array formed by row and column lines with the row and column lines defining respective cross points and including means for connecting an operating voltage source to selected row and column lines, wherein the improvement comprises a plurality of relays having at least two stable positions and each having an operating coil associated with a corresponding one of said cross points and responsive to the application of an operating voltage to its associated row and column line to be set to a corresponding stable position, a voltage-dependent, current-direction-independent resistor connected in series with each said relay coil between the associated row and column lines of the corresponding cross point, each said resistor having a relatively high resistance when supplied with a voltage of less than a critical value, but having a relatively low resistance when supplied with a voltage greater than said critical value, and said resistors and relays being so selected that the sum of said critical voltage value in relation to each said resistor and the voltage necessary to energize an operating coil for operation of its associated one of said relays is less than the operating voltage applied to said selected row and column lines by the voltage source, and said operating voltage is less than three times said critical voltage value.

2. The apparatus of claim 1 in which said resistors are varistors.

3. The apparatus of claim 1 in which said resistors are glow lamps.

References Cited

UNITED STATES PATENTS

| | | |
|---|---|---|
| 3,349,186 | 10/1967 | Bereznak. |
| 2,578,701 | 12/1951 | Hecht. |
| 3,223,978 | 12/1965 | Johnson. |
| 2,889,508 | 6/1959 | McCoy et al. |

KATHLEEN H. CLAFFY, *Primary Examiner.*

ALBIN H. GESS, *Assistant Examiner.*